US008037871B2

(12) United States Patent
McClendon

(10) Patent No.: US 8,037,871 B2
(45) Date of Patent: Oct. 18, 2011

(54) SEAL ASSEMBLY FOR A PRESSURIZED FUEL FEED SYSTEM FOR AN INTERNAL COMBUSTION ENGINE

(75) Inventor: Gene McClendon, Oklahoma City, OK (US)

(73) Assignee: Cameron International Corporation, Houston, TX (US)

( * ) Notice: Subject to any disclaimer, the term of this patent is extended or adjusted under 35 U.S.C. 154(b) by 535 days.

(21) Appl. No.: 10/639,540

(22) Filed: Aug. 12, 2003

(65) Prior Publication Data

US 2005/0034705 A1 Feb. 17, 2005

(51) Int. Cl.
*F02D 9/08* (2006.01)
(52) U.S. Cl. ...................................... 123/527; 123/337
(58) Field of Classification Search .................. 123/527, 123/525, 337, 336, 184.21, 184.61, 184.49, 123/184.59, 403; 277/910, 313, 314, 591, 277/593, 602, 608, 616, 641, 638, 611
See application file for complete search history.

(56) References Cited

U.S. PATENT DOCUMENTS

| | | | | |
|---|---|---|---|---|
| 3,747,963 A | * | 7/1973 | Shivak | 285/336 |
| 3,788,654 A | * | 1/1974 | Mandley | 277/434 |
| 4,068,821 A | * | 1/1978 | Morrison | 251/172 |
| 4,307,693 A | | 12/1981 | Glockler et al. | |
| 4,647,012 A | | 3/1987 | Gartner | |
| 4,691,671 A | * | 9/1987 | Nishimura | 123/73 V |
| 4,997,458 A | * | 3/1991 | Jones | 48/180.1 |
| 5,188,078 A | * | 2/1993 | Tamaki | 123/403 |
| 5,339,063 A | * | 8/1994 | Pham | 335/260 |
| 5,341,773 A | * | 8/1994 | Schulte et al. | 123/184.61 |
| 5,377,646 A | * | 1/1995 | Chasteen | 123/527 |
| 5,392,742 A | * | 2/1995 | Rush et al. | 123/184.61 |
| 5,538,262 A | * | 7/1996 | Matsumura | 277/608 |
| 5,669,350 A | * | 9/1997 | Altmann et al. | 123/337 |
| 5,752,487 A | | 5/1998 | Harrell et al. | |
| 5,967,116 A | * | 10/1999 | Kawashima et al. | 123/337 |
| 6,250,261 B1 | * | 6/2001 | Santarossa | 123/27 GE |
| 6,261,059 B1 | * | 7/2001 | Wadensten | 415/198.1 |
| 6,371,092 B1 | * | 4/2002 | Guglielmo et al. | 123/527 |
| 6,412,471 B1 | | 7/2002 | Trublowski et al. | |
| 6,644,259 B2 | * | 11/2003 | Storz | 123/184.21 |
| 6,698,404 B2 | * | 3/2004 | Palkowitsh | 123/527 |

* cited by examiner

*Primary Examiner* — Michael Cuff
*Assistant Examiner* — Hyder Ali
(74) *Attorney, Agent, or Firm* — Fletcher Yoder

(57) ABSTRACT

The seal assembly comprises providing a fuel conduit having a fluid flow passage therethrough for conveyance of a pressurized fuel-containing gas in a general fluid-flow direction with a first sealing surface disposed on the fuel conduit. A second sealing surface engages with the first sealing surface, such as to provide a fluid-tight connection preventing pressurized gas from leaving the fluid flow passage. The said first and second sealing surfaces are substantially perpendicular to the general fluid-flow direction. An o-ring is disposed between the first sealing surface and second sealing surface, the o-ring being compressed by the first and second sealing surfaces to form said fluid-tight connection. Preferably the o-ring is subjected to a squeeze of at least 40%, more preferably 50%, when the first and second sealing surfaces are coupled together. The sealing arrangement is most advantageously applied to throttle assemblies and the like, in particular for use with low-speed, gaseous fueled engines.

31 Claims, 4 Drawing Sheets

SEAL ASSEMBLY FOR A PRESSURIZED FUEL FEED SYSTEM FOR AN INTERNAL COMBUSTION ENGINE

FIELD OF THE INVENTION

The present invention relates to a seal assembly for use in a pressurized fuel feed system for an internal combustion engine, in particular for sealing the fluid flow passages of a throttle or carburetor or the like. The present invention thus provides a pressurized fuel feed system for an internal combustion engine, a throttle for use with an internal combustion engine operating on a pressurized fuel, and an internal combustion engine comprising such a pressurized fuel feed system and throttle.

BACKGROUND OF THE INVENTION

Systems for supplying fuel and fuel/air mixtures to internal combustion engines have long been known and are well developed. It is possible to characterize an internal combustion engine according to the manner in which the fuel is delivered to the inlet manifold of the engine. In many cases the engine is normally aspirated, that is using the low pressure or partial vacuum generated by the descending piston of the engine to draw fuel or a mixture of fuel and air into the cylinder. The amount of fuel fed to the engine and the flow of fuel/air mixture is typically regulated on such engines using a throttle or carburetor.

As an alternative to the normally aspirated fuel supply system, fuel injection systems have been developed and are now commonly employed on internal combustion engines operating with normally liquid hydrocarbon fuels, such as gasoline and diesel. In a typical fuel injection system, the normally liquid fuel is injected under pressure into the cylinders of the engine at the appropriate time during the combustion cycle.

One particular class of internal combustion engines are low speed, two cycle internal combustion engines powered by normally gaseous hydrocarbon fuels. Such engines typically operate at speeds below 1000 rpm, often in the range of from 250 to 500 rpm. The normally gaseous hydrocarbon fuels combusted by these engines include natural gas, associated gas, and refinery gas, as well as sour gas, such as produced from waste sites and sewerage treatment plants. The normally gaseous fuel is fed under pressure by a fuel supply system to the inlet manifold of the engine. The flow rate of the fuel, and hence the operating speed of the engine, is regulated by a throttle assembly. An example of such engines is the Ajax™ range of engines available commercially from Cooper Cameron Corporation.

During operation of any internal combustion engine, it is important that the integrity of the fuel supply system is maintained, in order to avoid leakage of fuel. This is important to avoid potentially hazardous situations developing from the build up of combustible and potentially explosive concentrations of the fuel in the air surrounding the engine. It is also important to prevent fuel leakage from any part of the engine for environmental reasons. To this end, it is essential that any joint or connection in the fuel system is properly assembled and sealed, so as to retain the fuel within the system. Various types of sealing arrangement have been employed. One of the most common sealing arrangement is to form joints or connections in the fuel system using mating flanges, between which is sandwiched a gasket of a suitable sealing material. The flanges are fastened together, typically using bolts, to compress the gasket sufficiently to form the requisite seal. Such gasketed joints are amongst the most common form of joint in internal combustion engines and find widespread use, in particular in normally aspirated engines.

Engines operating with a fuel injection system may require an alternative sealing arrangement to be employed, in order to prevent fuel escaping. In particular, it is known to employ o-rings to seal the injectors of fuel injection systems into the respective bore in the cylinder head. The o-ring functions to seal the injector element into the bore and prevent fuel escaping from the cylinder, when under compression.

Thus, U.S. Pat. No. 4,307,693 discloses a fuel injection installation for internal combustion engines, in which injection valves for supplying fuel to the engine are sealed to either the intake manifold of the engine or to the cylinder head by at least one o-ring. The o-ring is braced only in the radial direction. In the arrangement disclosed, the o-ring is compressed between a first surface on the injector valve and a second surface formed in the bore in the manifold or cylinder head, both the first and second surfaces being parallel to the direction of flow of the fuel within the injection valve. It is specifically noted in U.S. Pat. No. 4,307,693 that longitudinal or axial bracing of the o-ring is to be avoided.

Similarly, U.S. Pat. No. 4,647,012 discloses an injection valve for an internal combustion engine, in which the valve is retained in a bore in the suction pipe or manifold by a sealing ring or o-ring. As with U.S. Pat. No. 4,307,693, the o-ring is retained between two surfaces one each formed on the injection valve and the bore and is subjected to a radial compression force. U.S. Pat. No. 4,307,693 discloses a chamfered collar for use in the insertion of the injection valve in the bore, in order to avoid damage being caused to the o-ring.

U.S. Pat. No. 5,752,487 similarly discloses the use of an o-ring to seal an injector in a cylinder head. The o-ring is retained in a groove and subjected to a radial compression against the surface of the bore into which the injector is installed. The o-ring is not subjected to an axial or longitudinal compression parallel to the line of flow of the fuel within the injector assembly. U.S. Pat. No. 5,752,487 discloses the use of a carbon dam disposed between the o-ring and the cylinder head, the function of which is to insulate the o-ring from excessive temperatures generated during conventional operation of the engine.

U.S. Pat. No. 6,412,471 discloses a throttle body system with an integrated electronic system for engine control and management. The engine shown and described in U.S. Pat. No. 6,412,471 is an internal combustion engine with a fuel injection system, by which fuel is injected directly into the inlet manifold of the engine. The flow of air to the engine is controlled using the throttle forming the subject of U.S. Pat. No. 6,412,471. The throttle comprises a passage for the flow of air, in which is located a movable throttle plate, by which the flow of air through the throttle is controlled. A mass air flow sensor is retained in a bore in the wall of the throttle body. The mass air flow sensor is sealed to the outer surface of the throttle body by an o-ring compressed between the mounting head of the sensor and the outer surface. The disclosure of U.S. Pat. No. 6,412,471 clearly indicates that the air flow through the throttle to the engine arises as a result of the induction stroke of the engine. Thus, the gas pressure generated within the throttle body is a partial vacuum, of the order generated in conventional, normally aspirated engines.

It has been found that fuel leaks can occur from the pressurized fuel supply system of certain fuel injected engines. In particular, it has been found that the high gas pressures required for the operation of the class of low-speed, two cycle gaseous fuel engines mentioned hereinbefore can give rise to gas leaks with conventional, known fuel supply systems. In particular, it has been found that the known sealing arrangements of throttle bodies used to control the flow of the pressurized gaseous fuel cannot maintain their integrity under the high pressures employed. This has led to fuel leaks occurring.

Accordingly, there is a need for an improved design of seals for pressurized normally gaseous fuel supply systems, in particular for the sealing of the throttle assembly used to control the flow of the gaseous fuel.

SUMMARY OF THE INVENTION

It has now been found that an improved fuel supply system can be provided with improved sealing arrangements by employing o-rings compressed between opposing surfaces, such as flanges, which extend perpendicular to the general direction of fuel flow within the system. Contrary to the teachings in the prior art as noted above, it has been found that the use of an axial compression force on the o-ring can provide an improved seal.

Accordingly, the present invention provides a fuel supply system for an internal combustion comprising:
- a fuel conduit having a fluid flow passage therethrough for conveyance of a pressurized fuel-containing gas in a general fluid-flow direction;
- a first sealing surface disposed on the fuel conduit;
- a second sealing surface engaged with the first sealing surface, such as to provide a fluid-tight connection preventing pressurized gas from leaving the fluid flow passage;
- said first and second sealing surfaces are substantially perpendicular to the general fluid-flow direction;
- an o-ring disposed between the first sealing surface and second sealing surface, the o-ring being compressed by the first and second sealing surfaces to form said fluid-tight connection.

The o-ring seal may be used to seal any opening in the fuel system. Thus, in one embodiment, the fuel conduit is a throttle body and the second sealing surface is formed on cover plate mounted over an opening in the throttle body. Preferably, the o-ring extends around the fuel conduit, for example between two flanges connecting the fuel conduit to another component of the engine, such as the inlet manifold or cylinder head. The o-ring sealing arrangement may also be employed to seal the fuel conduit at the connection between the throttle body and other components, such as the throttle actuator.

The o-ring is preferably located in a groove, which may be formed in either one or both of the first and second sealing surfaces. The walls of the groove serve to retain the o-ring in place and provide little or no compressive force to the o-ring.

Conventionally, o-rings are subjected to a squeeze of no more than 30%. In this respect, the "squeeze" on the o-ring when in place is to be understood as the reduction in thickness of the o-ring measured in the direction of the compressive force being applied. Thus, a 30% squeeze applied to the o-ring will result in the o-ring being deformed such that its thickness measured in the direction of the applied force is reduced by 30%, or is just 70% of the thickness of the o-ring when at rest. In the present invention, in situations where an increased seal performance is required, it is preferred that the o-ring is subjected to a squeeze of greater than 30%, preferably at least 40%, more preferably at least 50%. Such a higher o-ring squeeze is required, for example, at the junction of the throttle body and the throttle actuator.

As noted, there is a particular need for an improved sealing arrangement for mounting throttle bodies for engines running on pressurized, normally gaseous fuels. Accordingly, in a further aspect the present invention provides a throttle for a fuel supply system of an internal combustion engine, the fuel supply system supplying a pressurized normally gaseous fuel to the engine, the throttle comprising:
- a throttle body having a fluid flow passage therethrough for conveyance of a pressurized fuel-containing gas in a general fluid-flow direction;
- a first sealing surface disposed on the throttle body;
- a second sealing surface engaged with the first sealing surface, such as to provide a fluid-tight connection preventing pressurized gas from leaving the fluid flow passage;
- an o-ring disposed between the first sealing surface and second sealing surface, the o-ring being compressed by the first and second sealing surfaces to form said fluid-tight connection.

Preferably, the first and second sealing surfaces extend substantially perpendicular to the general fluid-flow direction, with the o-ring preferably extending around the fluid flow passage.

The second sealing surface may be formed on a cover plate mounted over an opening in the throttle body. The throttle is mounted to other components of the fuel supply system, for example an actuator, and/or to the cylinder head or manifold of the engine itself.

As noted before, the o-ring is preferably located in a groove formed in one or both of the first and second sealing surfaces. Again, as noted hereinbefore, the o-ring is preferably subjected to a squeeze of at least 40%, more preferably 50%.

A further aspect of the present invention provides a low speed, pressurized gaseous fuel internal combustion engine comprising:
- a fuel feed system for supplying pressurized gaseous fuel to an inlet of the internal combustion engine;
- the fuel feed system comprising a throttle for regulating the flow of pressurized gaseous fuel to the internal combustion engine;
- the throttle comprising a throttle body having a fluid flow passage therethrough for conveyance of the pressurized gaseous fuel in a general fluid-flow direction;
- a first sealing surface disposed on the throttle body;
- a second sealing surface engaged with the first sealing surface, such as to provide a fluid-tight connection preventing pressurized gaseous fuel from leaving the fluid flow passage;
- an o-ring disposed between the first sealing surface and second sealing surface, the o-ring being compressed by the first and second sealing surfaces to form said fluid-tight connection.

The specific arrangements of the throttle and the o-ring seal may be as hereinbefore described.

The improved sealing arrangement comprising o-rings provided by the present invention may be used in any engine application where an increased fluid pressure is required, such that conventional gasket arrangements are caused to leak. In general, conventional sealing arrangements relying upon gaskets offer acceptable performance for normally aspirated engines, in which the fuel supply system operates under a partial vacuum induced by the normal operation of the engine. Such sealing arrangements are also acceptable for fuel supply systems that operate with a low positive or superatmospheric fuel pressure. The sealing arrangement of the present invention is particularly advantageous when applied to pressurized fuel or fuel injection systems operating at higher pressures. In such cases, pressures in excess of 10 psig are commonly applied. For example, internal combustion engines, such as the Ajax™ range of engines mentioned hereinbefore, operating on pressurized natural gas typically require a nominal gas pressure of at least 15 psig. Typical operating gas supply pressures can range upwards from 20 psig, 25 psig, 30 psig and 50 psig. It has been found that the improved sealing arrangement of the present invention can allow higher pressures in the fuel supply system to be applied, with pressures in excess of 20 psig being operable. Under testing, the o-ring sealing arrangement when applied to a throttle for the Ajax™ has been found to withstand natural gas pressures of the order of 100 psig.

BRIEF DESCRIPTION OF THE DRAWINGS

Embodiments of the present invention will now be further described, by way of example only, having reference to the accompanying figures, in which:

Referring to FIG. 1, a throttle assembly, for, by way of example, an internal combustion engine 1, is shown and generally indicated as 2. The throttle assembly shown is a commercially available integrated throttle body (ITP) as supplied by Woodward Governor Company. The commercially available throttle assembly employs gasket connections throughout. These connections have been modified to provide a sealing arrangement in accordance with the present invention, as described in detail below.

Figure 1:
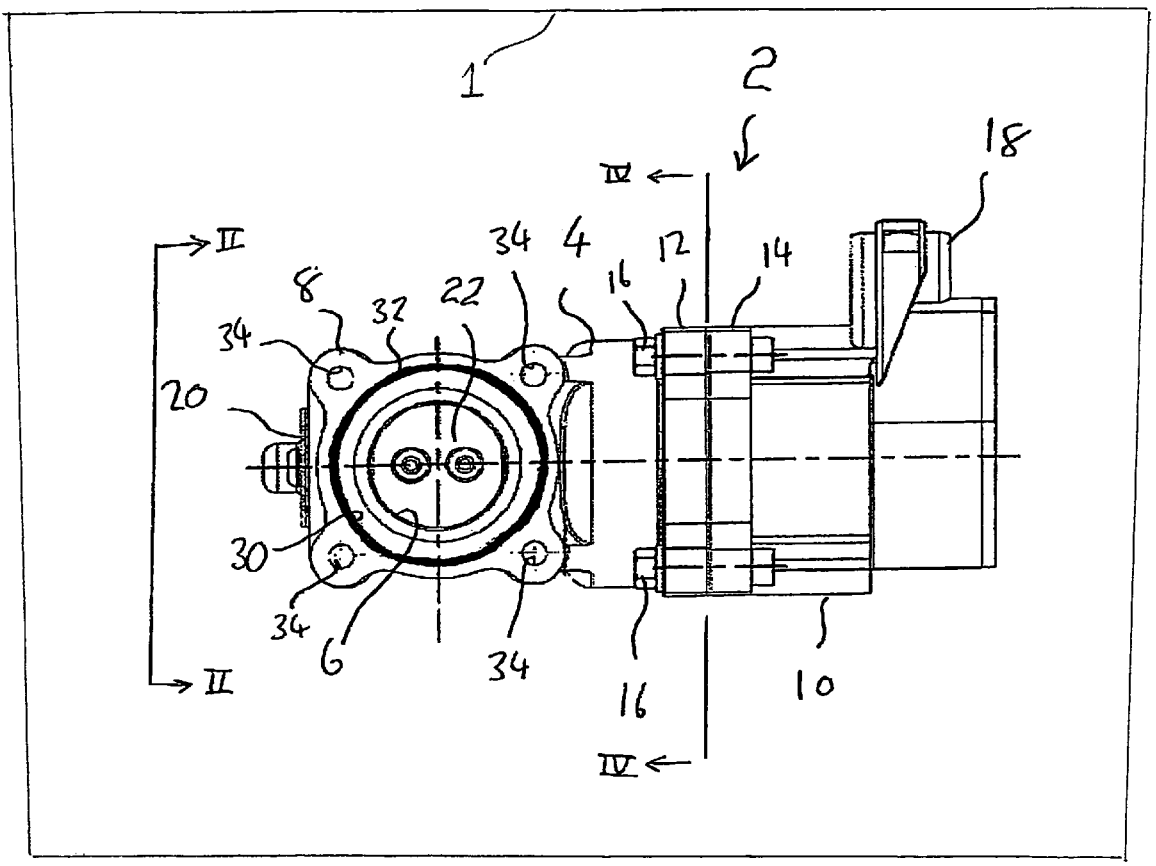
FIG. 1 is a perspective representation of a throttle assembly according to an embodiment of the present invention showing the inlet side of the throttle.

The throttle assembly 2 of FIG. 1 comprises a throttle body 4 having a substantially cylindrical fuel passage 6 therethrough. An inlet flange 8 is formed on the throttle body 4 such as to surround the inlet opening of the fuel passage 6. The inlet flange 8 may be connected to a corresponding flange of an engine fuel supply system (not shown for clarity). The throttle body 4 is mounted to a throttle actuator 10 by means of flanges 12 and 14 formed on the throttle body 4 and throttle actuator 10 respectively and bolts 16. The throttle actuator 10 may be an suitable actuating means for operating the throttle, for example a servo. Such actuators are commercially available, for example the Woodward LCS actuator. Control signals are supplied to the actuator by means of a connector 18.

The throttle body 4 is provided with an end plate 20, shown in more detail in FIG. 2 and described below. The end plate 20 locates and retains one end of a throttle shaft (not shown) extending across the fuel passage 6. The throttle shaft is operated by the actuator 10 and moves a throttle element 22 located in the fuel passage 6, thereby regulating the flow of gaseous fuel through the throttle assembly 2.

In accordance with the present invention, the inlet flange 8 of the throttle body 4 is provided with a circular groove 30, in which is located an o-ring 32. The o-ring 32 is prepared from any suitable rubber or elastomeric material, capable of providing the necessary sealing properties and withstanding the conditions prevailing in the throttle body 4 and associated equipment. Such materials and o-rings are commercially available.

The groove 30 in the inlet flange may be formed by any suitable means. Preferably, the groove 30 is machined in the inlet flange 8, thereby allowing the dimensions of the groove 30 to be accurately controlled. The groove 30 is sized such that the squeeze applied to the o-ring 32 when installed in an assembled apparatus is no more than 30%. The inlet flange 8 is provided with holes 34, through which bolts (not shown) can be used to secure the inlet flange 8 to the associated fuel feed apparatus. The holes 34 and bolts are sized to apply the necessary force to o-ring 32 to achieve the required level of squeeze.

Figure 2:
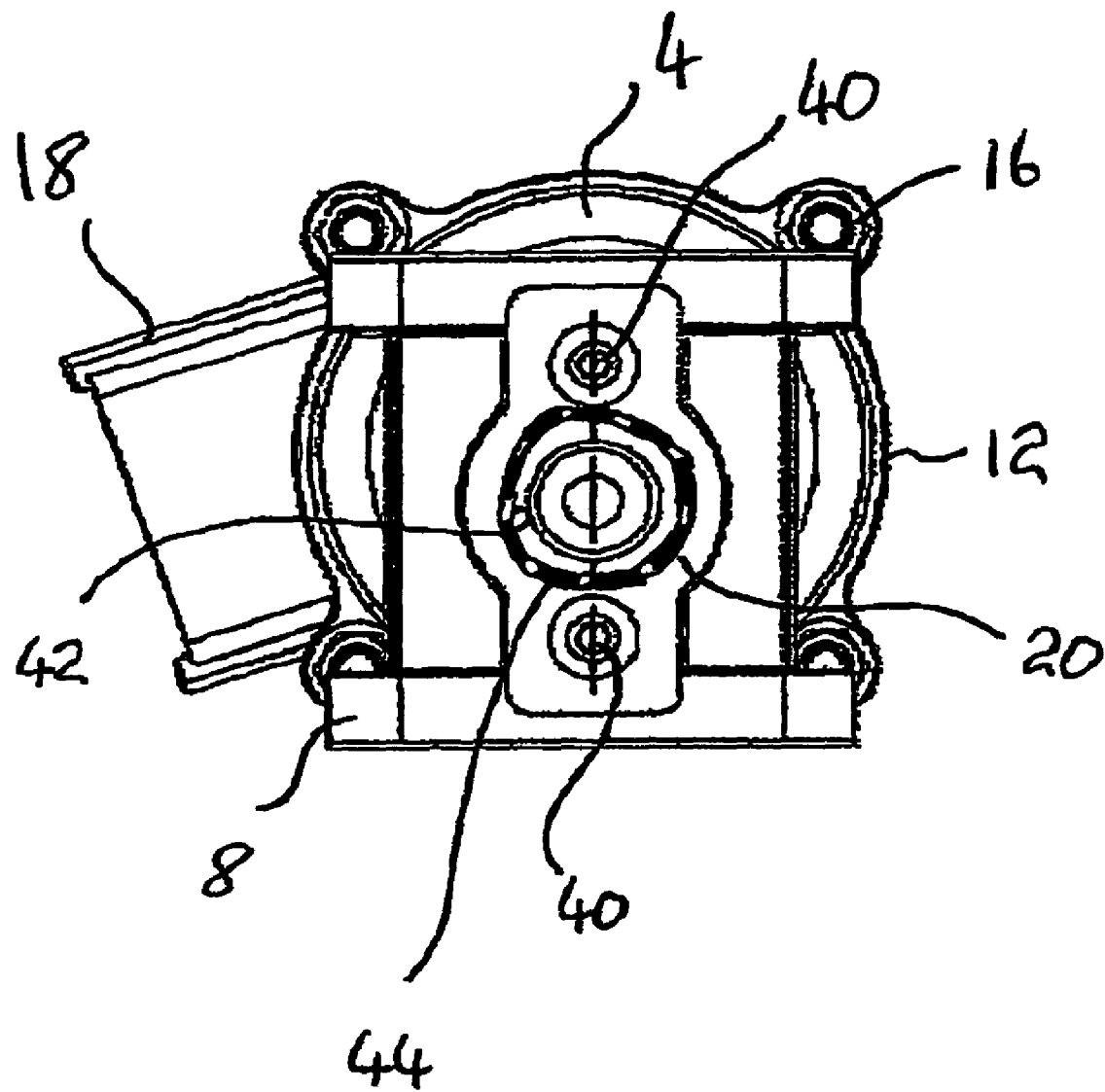
FIG. 2 is a perspective representation of the throttle assembly of FIG. 1 along the line II-II.

Referring to FIG. 2, a perspective view of the throttle assembly 2 showing the end plate 20 is shown. The end plate 20 is secured to the throttle body 4 by means of bolts 40. The end plate 20 is formed with a groove 42, in which is located an o-ring 44 (indicated as a dotted line in FIG. 2). The o-ring 44 is located between the end plate 20 and the throttle body 4, so as to provide a seal around the shaft extending within the throttle body 4. The groove 42 and o-ring 44 are sized according to the dimensions of the end plate and the hole to be sealed. The o-ring and groove are formed as described above.

Figure 3:
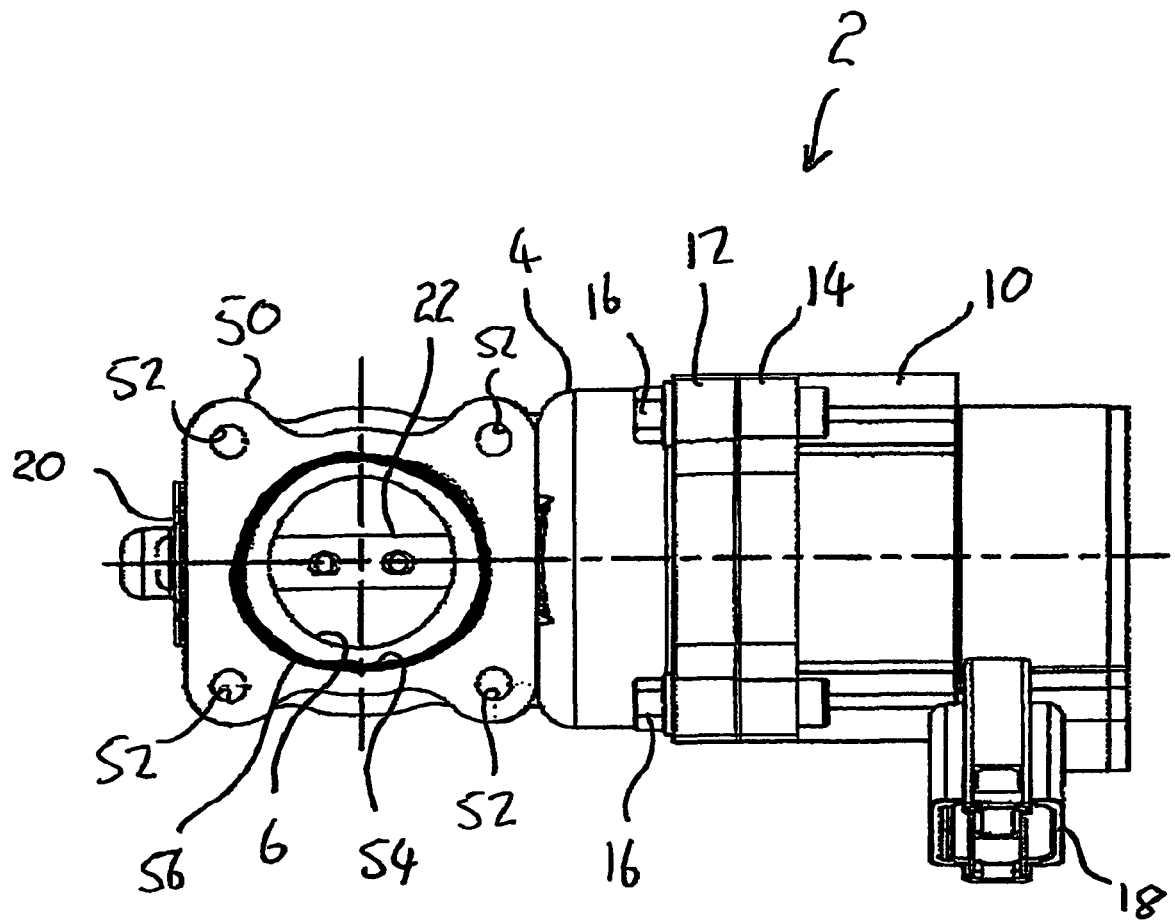
FIG. 3 is a perspective representation of the throttle assembly of FIG. 1 showing the outlet side of the throttle.

FIG. 3 is a further perspective view of the throttle assembly 2, showing the outlet of the fuel passage 6. The outlet of the fuel passage 6 is defined by an outlet flange 50, having holes 52 for bolts. The outlet flange 50 is formed with a groove 54, in which is located an o-ring 56. The groove 54 and o-ring 56 in the outlet flange are formed and employed as described above in connection with the sealing arrangement of the inlet flange 8.

Figure 4:
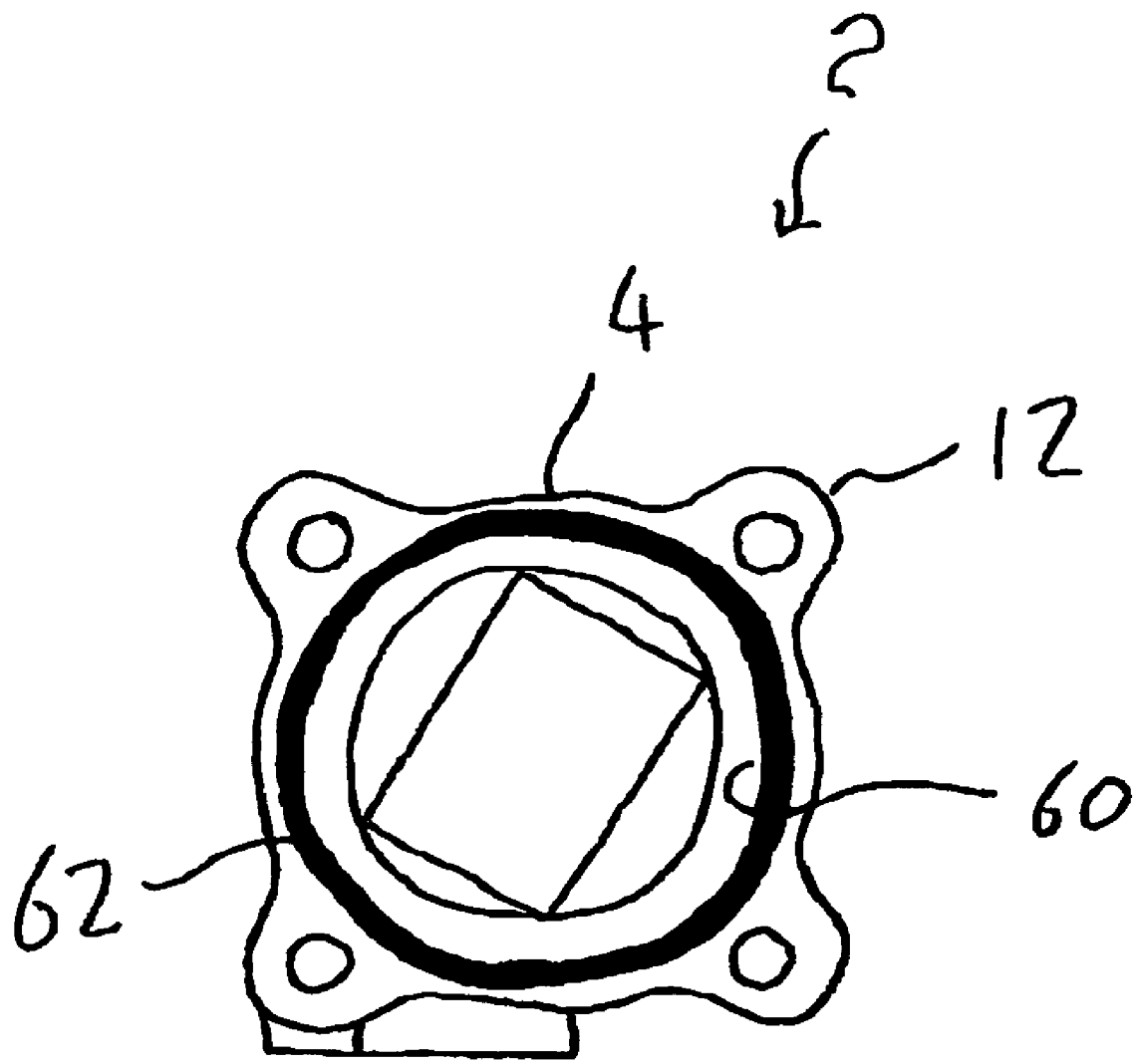
FIG. 4 is a cross-sectional view along the line IV-IV of FIG. 1.

Referring to FIG. 4, a sectional view of the joint between the throttle body 4 and the actuator 10 is shown. As can be seen, the flange 12 on the throttle body 4 is provided with a groove 60, in which is located an o-ring 62. The groove 60 and o-ring 62 provide a seal between the throttle body 4 and the actuator 10, preventing the escape of gaseous fuel from the throttle body 4. The groove 60 and o-ring 62 are formed and function as described hereinbefore with reference to the sealing arrangement for the inlet end of the fuel passage 6. The o-ring 62 may be subjected to the conventional level of squeeze, that is up to 30%. This may be found acceptable for the sealing duty to be performed. However, it has been found particularly advantageous to form the groove 60 such that the o-ring 62 is provided with a squeeze greater than 30%, preferably a squeeze of at least 40%, more preferably at least 50%. In this way, the completed assembly is able to maintain higher fuel pressures within the throttle assembly without leakage occurring.

In summary, the throttle assembly 2 shown in the accompanying figures is provided with an o-ring sealing arrangement according to the present invention at each opening of the fuel passage 6 in the throttle body. In this way, it is ensured that the integrity of the fuel passage is maintained at the high operating pressures of the gaseous fuel supply system. The o-ring sealing arrangement may thus be employed to seal some or, most preferably all of the openings of the fuel passage.

In one aspect, it is contemplated that the apparatus being provided with the o-ring sealing arrangement of the present invention is manufactured with the appropriate grooves. Alternatively, it is within the scope of the present invention to modify an apparatus, such as a commercially available throttle assembly, to replace conventional gasketed joints with a sealing arrangement employing o-rings, as described above. Alternatively, the throttle body may be provided with an o-ring and o-ring groove at one or more openings of the fuel passage, which o-ring and groove locate against a conventional mating sealing surface. In this way, a throttle body may be modified and fitted to an existing engine assembly, with minimal further modification of the engine being required.

The embodiments shown in the figures and described hereinbefore employ a single o-ring at each joint. Should the need arise, it is possible to provide the joint with two or more o-rings, in order to achieve the necessary sealing integrity.

While the preferred embodiments of the present invention have been shown in the accompanying figures and described above, it is not intended that these be taken to limit the scope of the present invention and modifications thereof can be made by one skilled in the art without departing from the spirit of the present invention.

What is claimed is:

1. A fuel supply system for supplying a pressurized gaseous fuel to a low speed internal combustion engine comprising:
    a fuel conduit having a fluid flow passage therethrough for conveyance of a pressurized fuel-containing gas in a general fluid-flow direction;
    a first sealing surface disposed on the fuel conduit;
    a second sealing surface engaged with and parallel to the first sealing surface, to provide a fluid-tight connection preventing pressurized gas from leaving the fluid flow passage;
    said first and second sealing surfaces are substantially perpendicular to the general fluid-flow direction;
    an o-ring disposed between the first sealing surface and second sealing surface, the o-ring being compressed by the first and second sealing surfaces to form said fluid-tight connection;
    wherein the o-ring when acted upon by the first and second sealing surfaces has a thickness that is at least 30% less than the thickness of the o-ring when not acted upon by the first and second sealing surfaces.

2. The fuel supply system as claimed in claim 1, wherein the o-ring extends around the fuel conduit.

3. The fuel supply system as claimed in claim 1, wherein the fuel conduit is a throttle body.

4. The fuel supply system as claimed in claim 3, wherein the second sealing surface is formed on a cover plate mounted over an opening in the throttle body.

5. The fuel supply system as claimed in claim 3, further comprising an actuator for the throttle, wherein the second sealing surface is formed on the actuator.

6. The fuel supply system as claimed in claim 1, wherein the first sealing surface is formed on a flange extending from the fuel conduit.

7. The fuel supply system as claimed in claim 1, wherein the o-ring is located in a groove.

8. The fuel supply system as claimed in claim 7, wherein the groove is formed in the first sealing surface.

9. The fuel supply system as claimed in claim 1, wherein the o-ring between the first sealing surface and second sealing surface has a thickness that is at least 40% less than the thickness of the o-ring when not acted upon by the first and second sealing surfaces.

10. The fuel supply system as claimed in claim 9, wherein the o-ring when acted upon by the first and second sealing surfaces has a thickness that is at least 50% less than the thickness of the o-ring when not acted upon by the first and second sealing surfaces.

11. A throttle for a fuel supply system of a low speed internal combustion engine, the fuel supply system supplying a pressurized normally gaseous fuel to the engine, the throttle comprising:
    a throttle body having a pressurized fuel gas flow passage therethrough for conveyance of a pressurized fuel-containing gas in a general fluid-flow direction;
    a first sealing surface disposed on the throttle body;
    a second sealing surface engaged with and parallel to the first sealing surface, to provide a fluid-tight connection preventing pressurized gas from leaving the pressurized fuel gas flow passage;
    an o-ring disposed between the first sealing surface and second sealing surface, the o-ring being compressed by the first and second sealing surfaces to form said fluid-tight connection, wherein the o-ring when acted upon by the first and second sealing surfaces has a thickness that is at least 30% less than the thickness of the o-ring when not acted upon by the first and second sealing surfaces.

12. The throttle as claimed in claim 11, wherein the first and second sealing surfaces extend substantially perpendicular to the general fluid-flow direction.

13. The throttle as claimed in claim 12, wherein the o-ring extends around the pressurized fuel gas flow passage.

14. The throttle as claimed in claim 11, wherein the second sealing surface is formed on a cover plate mounted over an opening in the throttle body.

15. The throttle as claimed in claim 11, further comprising an actuator for the throttle, wherein the second sealing surface is formed on the actuator.

16. The throttle as claimed in claim 11, wherein the first sealing surface is formed on a flange extending from the throttle body.

17. The throttle as claimed in claim 11, wherein the o-ring is located in a groove.

18. The throttle as claimed in claim 17, wherein the groove is formed in the first sealing surface.

19. The throttle as claimed in claim 11, wherein the o-ring when acted upon by the first and second sealing surfaces has a thickness that is at least 40% less than the thickness of the o-ring when not acted upon by the first and second sealing surfaces.

20. The throttle as claimed in claim 19, wherein the o-ring when acted upon by the first and second sealing surfaces has a thickness that is at least 50% less than the thickness of the o-ring when not acted upon by the first and second sealing surfaces.

21. A low speed, pressurized gaseous fuel internal combustion engine comprising:
    a pressurized fuel gas feed system for supplying pressurized gaseous fuel to an inlet of the internal combustion engine;
    the pressurized fuel gas feed system comprising a throttle for regulating the flow of pressurized gaseous fuel to the internal combustion engine;
    the throttle comprising a throttle body having a pressurized fuel gas flow passage therethrough for conveyance of the pressurized gaseous fuel in a general fluid-flow direction;
    a first sealing surface disposed on the throttle body;
    a second sealing surface engaged with the first sealing surface, to provide a fluid-tight connection preventing pressurized gaseous fuel from leaving the fluid flow passage;
    an o-ring disposed between the first sealing surface and second sealing surface, the o-ring being compressed by the first and second sealing surfaces to form said fluid-tight connection, wherein the o-ring when acted upon by the first and second sealing surfaces has a thickness that is at least 30% less than the thickness of the o-ring when not acted upon by the first and second sealing surfaces.

22. The internal combustion engine as claimed in claim 21, wherein the first and second sealing surfaces extend substantially perpendicular to the general fluid-flow direction.

23. The internal combustion engine as claimed in claim 22, wherein the o-ring extends around the fluid flow passage.

24. The internal combustion engine as claimed in claim 21, wherein the second sealing surface is formed on a cover plate mounted over an opening in the throttle body.

25. The internal combustion engine as claimed in claim 21, further comprising an actuator for the throttle, wherein the second sealing surface is formed on the actuator.

26. The internal combustion engine as claimed in claim 21, wherein the first sealing surface is formed on a flange extending from the throttle body.

27. The internal combustion engine as claimed in claim 21, wherein the o-ring is located in a groove.

28. The internal combustion engine as claimed in claim 27, wherein the groove is formed in the first sealing surface.

29. The internal combustion engine as claimed in claim 21, wherein the o-ring when acted upon by the first and second sealing surfaces has a thickness that is at least 40% less than the thickness of the o-ring when not acted upon by the first and second sealing surfaces.

30. The internal combustion engine as claimed in claim 21, wherein the o-ring provides a seal under an operating pressure for the pressurized gaseous fuel of up to 100 psi.

31. A system, comprising:
an internal combustion engine having a pressurized gaseous fuel source;
a fuel conduit having a fluid flow passage therethrough for conveyance of a pressurized fuel-containing gas in a general fluid-flow direction;
a first sealing surface disposed on the fuel conduit;
a second sealing surface engaged with the first sealing surface, to provide a fluid-tight connection preventing pressurized gas from leaving the fluid flow passage;
said first and second sealing surfaces being substantially perpendicular to the general fluid-flow direction; and
an o-ring disposed between the first sealing surface and second sealing surface, the o-ring being compressed by the first and second sealing surfaces to form said fluid-tight connection, wherein the o-ring is at least partially disposed in a groove located on the first sealing surface and a further groove located on the second sealing surface, the o-ring when acted upon by the first and second sealing surfaces having a thickness that is at least 30% less than the thickness of the o-ring when not acted upon by the first and second sealing surfaces.

* * * * *